(12) United States Patent
Pollard

(10) Patent No.: US 6,500,071 B1
(45) Date of Patent: Dec. 31, 2002

(54) FLEXIBLE COUPLING

(75) Inventor: Andrew Pollard, Bridgnorth (GB)

(73) Assignee: GKN Automotive GmbH, Lohmar (DE)

( * ) Notice: Subject to any disclaimer, the term of this patent is extended or adjusted under 35 U.S.C. 154(b) by 0 days.

(21) Appl. No.: 09/806,602

(22) PCT Filed: Sep. 28, 1999

(86) PCT No.: PCT/GB99/03223

§ 371 (c)(1),
(2), (4) Date: Apr. 2, 2001

(87) PCT Pub. No.: WO00/20771

PCT Pub. Date: Apr. 13, 2000

(30) Foreign Application Priority Data

Oct. 2, 1998 (GB) .............................................. 9821491

(51) Int. Cl.[7] .................................................. F16D 3/62
(52) U.S. Cl. .............................. 464/69; 464/98; 464/137
(58) Field of Search ............................ 464/98, 69, 99, 464/93, 137

(56) References Cited

U.S. PATENT DOCUMENTS

| | | | |
|---|---|---|---|
| 4,661,084 A | * | 4/1987 | Federn ......................... 464/69 |
| 4,768,992 A | | 9/1988 | Mancuso et al. |
| 5,163,876 A | | 11/1992 | Zilberman et al. |
| 5,338,259 A | * | 8/1994 | Lobel ........................... 464/93 |
| 5,660,590 A | | 8/1997 | Deperrois |
| 5,851,150 A | * | 12/1998 | Mayerjak ...................... 464/69 |
| 5,976,662 A | * | 11/1999 | Pollard et al. ................. 464/93 |

FOREIGN PATENT DOCUMENTS

DE    41 40 311 A1    6/1993

OTHER PUBLICATIONS

Beitz W.—"Dubbel Taschenbuch für den Maschinenbau" 1987, Springer, Berlin XP002128135 p. C42, line 1—p. C43, last line.

* cited by examiner

*Primary Examiner*—Lynne H. Browne
*Assistant Examiner*—Aaron M Dunwoody

(57) ABSTRACT

A flexible annular coupling made of composite material and an even number of relatively thicker fixing portions (10) spaced apart circumferentially around the coupling for connection to two rotary members to be coupled by the coupling and a flexible leaf (11) extending lengthwise between each two adjacent fixing portions. Each leaf includes a relatively thinner central part (11*a*) and a transition portion (13) of gradually increasing thickness between the ends of the central part and the thicker fixing portions. The coupling is constructed such that the central part (11*a*) of at least each circumferentially alternate leaf will always be displaced axially in the same predetermined direction (A) transverse to its length when the leaf is caused to buckle by compressive force(s) acting between the fixing portions at the ends of the leaf. The displacement may be obtained by curving the central part, by suitably shaping the transitional portions or by making the central part of two layers of different stiffness.

19 Claims, 8 Drawing Sheets

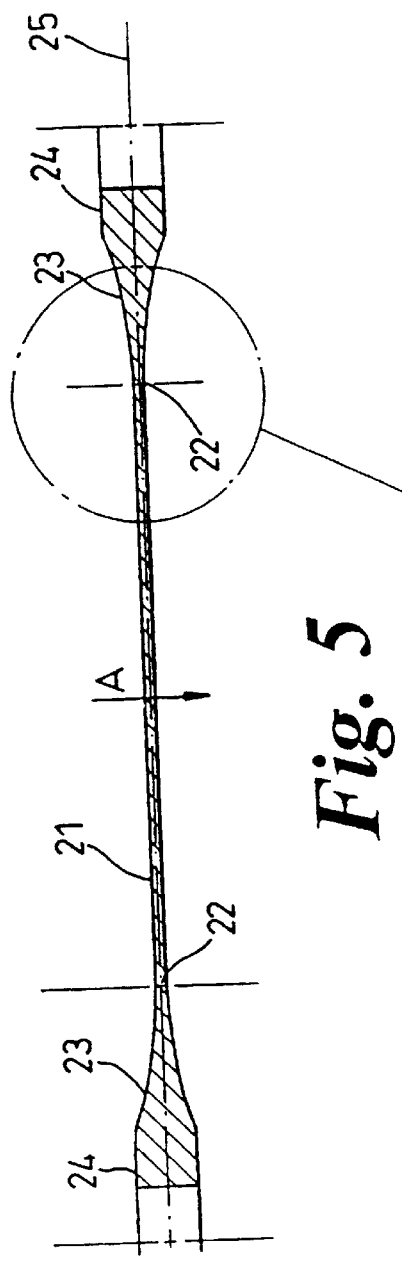
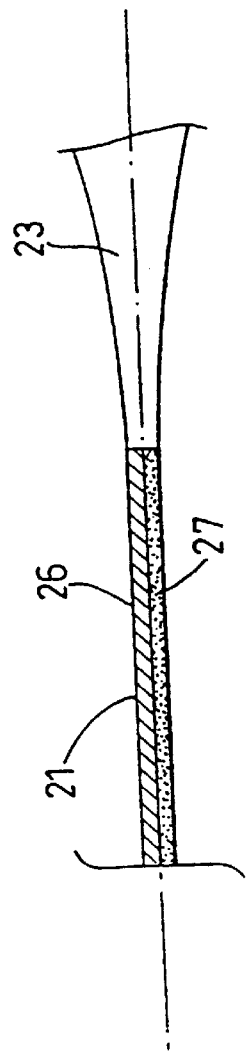
Fig. 5
Fig. 6

FLEXIBLE COUPLING

TECHNICAL FIELD

This invention relates to a flexible coupling which is of annular shape and comprises a plurality of fixing portions spaced circumferentially about the coupling and leaves extending between each adjacent pair of fixing portions. The latter are arranged for connection to two rotary members which are to be coupled. In use one rotary member is connected to alternate ones of the fixing portions and the other rotary member is connected to the other fixing portions.

The term "annular shape" is used herein to include not only a circular ring but also a polygon or other shape having an aperture surrounded by the leaves. The polygon may be made up of a number of separate links each comprising a leaf extending between fixing portions at the end of the leaf. The invention also includes such links.

BACKGROUND ART

Couplings of the type described above are known made as a unitary composite (fibre-reinforced plastic) laminated structure. Each leaf has a comparatively small thickness in the direction axially of the coupling, i.e. parallel to its axis of rotation in use, and has a relatively large width in the direction radially of the coupling (i.e. radially of such axis).

When torque is applied to a flexible composite coupling of the type described in the preceding paragraph, tensile strain develops in those leaves subjected to tensile forces and a compressive displacement is imposed on those leaves subjected to compressive forces. Small compressive displacements may be accommodated without buckling by compressive strain in the leaf but typical compressive displacements cause buckling of the leaves. In a flexible composite coupling rotating at 0° installed angle, i.e. with the axes of the coupled rotary members aligned, the leaves retain their buckled shape throughout continuous operation whilst transmitting torque. When a flexible coupling is used at an installed angle greater than zero, i.e. where there is angular misalignment between the axes of rotation of the coupled rotary members, tensile strain is imposed on all the leaves. If the strain due to the installed angle is smaller than the strain due to applied torque, stable buckling of the leaves loaded in compression is retained throughout rotation. This corresponds to the area of the operating diagram shown in FIG. 1 above the shaded zone. If the strain due to the installed angle is bigger than the strain due to applied torque, then there is no buckling of the leaves loaded in compression. This corresponds to the area of FIG. 1 below the shaded zone. A bi-stable buckling phenomenon is observed in the transition zone of the operating diagram because a condition occurs once per revolution where a displacement sufficient to cause buckling is imposed on the leaves loaded in compression. Symmetrical leaves are free to accommodate this displacement by buckling either way and they oscillate once per revolution between the alternate shapes caused by the bi-stable buckling motion.

Such a bi-stable buckling motion, i.e. the change of displacement of the central part of each leaf from being displaced axially in one direction from an unstressed position to being displaced axially in the other direction from said position, is noisy and can damage the coupling.

It is an object of the invention to provide a coupling which avoids this problem.

DISCLOSURE OF THE INVENTION

According to the invention we provide flexible annular coupling made of composite (fibre-reinforced plastic) material and comprising an even number of relatively thicker fixing portions spaced apart circumferentially around the coupling for connection to two rotary members to be coupled by the coupling and a flexible leafextending lengthwise between each two adjacent fixing portions, each leaf comprising a relatively thinner central part and transition portions of gradually increasing thickness between the ends of the central part and the relatively thicker fixing portions; characterized in that the coupling is so constructed that the central part of at least each circumferentially alternate leaf will always be displaced axially (as defined above) in the same direction transverse to its length when such leaf is caused to buckle by compressive force(s) acting between the fixing portions at the ends of the leaf It is only necessary, in theory, that alternate ones of the leaves are arranged so that they buckle in a pre-determined direction in compression if these can be arranged to be the leaves which will be in compression in use. However if a coupling is to be used to transmit torque in both senses, (i.e. positive and negative torques) then the central portion of each leaf must buckle in a pre-determined direction when the leaf is longitudinally compressed. It is not necessary that the central parts of all the leaves be displaced in the same direction on buckling, it is only necessary that, for a particular leaf, its central part will always be displaced in the pre-determined direction when the leaf buckles under compression.

Various constructions may be used to ensure that the central parts of the leaves are displaced in a pre-determined direction on compressive buckling of the leaves. Thus the transition portions at the ends of each leaf may be shaped so as to effect the buckling in the pre-determined direction. Alternatively, or in addition, the central portion of each leaf which is required to be displaced in a pre-determined direction on buckling may be made of two layers of material one of which is stiffer than the other to resist lengthwise compression. Each layer may extend over the whole width of the central parts of the leaves. The central part of the leaf will then displace towards the stiffer layer on buckling. The required difference in stiffness may be effected by selection of specific fibre orientations relative to the axis of the leaf and/or by the use of reinforcing fibres of different moduli.

In another and preferred arrangement the central part of each of those leaves in which the central part is to be displaced in a pre-determined direction on buckling is, in an unstressed state, curved between its ends so that the curved part projects axially in the pre-determined direction in which the central part will be displaced when the leaf buckles under compression. The central part projects to one side, and one side only, of a plane perpendicular to the rotary axis of the coupling and passing through the axial mid-points of fixing elements.

The radius of curvature of the central part in this case may be between 10 and 500 times the axial thickness of the central part of the leaf. The central part of each curved leaf may have a central, offset curved portion between intermediate portions of uniform thickness which are parallel to said plane and extend from the central portion to the adjacent ends of the transition portions. The length of each intermediate portion may be between L/50 and L/10 where "L" is the distance parallel to said plane between the centres of fixing holes in adjacent fixing portions. The thickness (S) of the central portion and of the intermediate portions may be between L/250 and L/25 where L is as defined above.

The thickness (T) of each fixing portion may be between 2S and 10S where (S) is as defined above. Each transition portion may extend a distance of between 0.1 and 0.4L from the centre of a fixing hole in its adjacent fixing portion where L is as defined above.

The maximum offset of the central part of the leaf measured between the neutral axis of the curved part and said plane may be between L/250 and L/25 where L is as defined above.

The radial width of the central part of each leaf may be at least 10 times its axial thickness. There have been many proposals to make flexible couplings of a plurality of thin metal rings or links. Examples are U.S. Pat. Nos. 1,947,052; 3,759,064 and 4,768,992. The metal rings or links include curved portions between their ends. In some cases the curves are sinusoidal and extent on both sides of the neutral axis of the ring or link.

In all cases the curved portions are said to be included to improve the flexibility of the coupling, i.e. to enable the coupling to transmit torque when the axes of the driving and driven members connected by the coupling are angularly misaligned.

The maximum angular misalignment at which a laminated steel coupling can operate at its rated torque is typically about 0.5°, said couplings being restricted to the allowable working strain of steel. A single lamina metal diaphragm coupling would have an even lower maximum angle of misalignment of about 0.2° at which it could operate at its rated torque.

It has also been proposed in DE-A-41 40 311 to have a flexible annular coupling made of fibre-reinforced plastic material comprising an even number of fixing portions spaced apart circumferentially around the coupling for connection to two rotating members. A flexible leaf extends lengthwise between each two adjacent fixing portions. The coupling includes apertured reinforcing collars associated with the fixing portions. The collars and reinforcing portions have complementary interfitting formations which maybe conical or cylindrical.

A fibre composite coupling of the type with which the invention is concerned can typically operate at its rated torque when the driving and driven shafts have an angular misalignment of about 2° with a corresponding higher working strain than is acceptable for steel. It is the working strain which provides the energy which causes the bistable buckling referred to above. The lower working strain in a steel coupling would not normally produce the phenomenon. A fibre composite coupling may operate for a restricted time at an angular misalignment up to 4°.

Not surprisingly, therefore, none of the patents dealing with metal flexible couplings deals with how to avoid bistable buckling. There is no suggestion in the patents that to curve the leaves in a fibre composite coupling would provide a solution to bistable buckling. The curves in the steel links or rings are provided as a means to increase flexibility.

There is, in fact, a contra-indication against curving the leaves of a fibre composite coupling. Through-thickness stresses in a composite coupling tend to delaminate the coupling since it does not have much strength in the through-thickness direction. Curving the leaves produces through-thickness stresses in the tension leaves as they tend to straighten when the coupling is transmitting torque. So this is another reason why a skilled man would not have considered curving the leaves to be a solution to the bi-stable buckling problem with which he is faced.

The aim of the present invention is to cause the compression links to buckle in a pre-determined direction. All the different ways of effecting the buckling of the leaves in a pre-determined direction have, as a common feature, that the central parts of the leaves, and/or the transitional portions if provided are asymmetrical either in shape or construction with respect to a plane perpendicular to the rotary axis of the coupling and passing through the axial mid points of adjacent fixing portions. This is described in more detail below.

The coupling may be made as a unitary member of composite material or as a number of separate links of composite material each of which comprises two fixing portions with a leaf extending between them, the fixing portions of adjacent links overlapping where the links are secured to a rotary member to be coupled. The construction makes for ease of servicing.

BRIEF DESCRIPTION OF THE DRAWINGS

The invention will now be described by way of example with reference to FIGS. 2 and 12 of the accompanying drawings, in which:

FIGS. 4 and 5 are sections similar to FIG. 3 of a leaf of second and third embodiments of the invention;

FIG. 6 is a detail view of part of the leaf of FIG. 5;

BEST MODE FOR CARRYING OUT THE INVENTION

Figure 2:
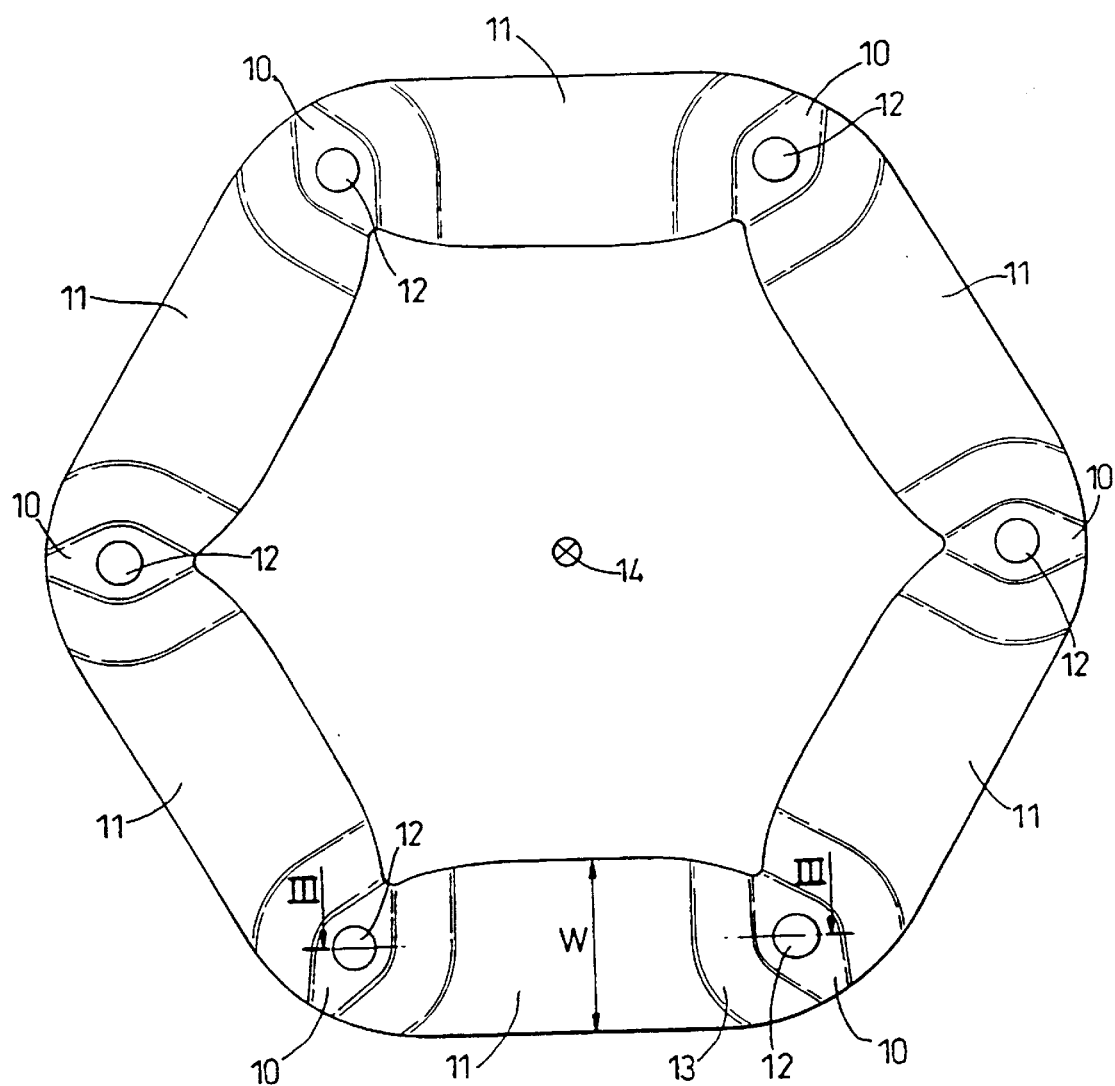
FIG. 2 is an axial view of a coupling constituting one embodiment of the invention.
Figure 3:
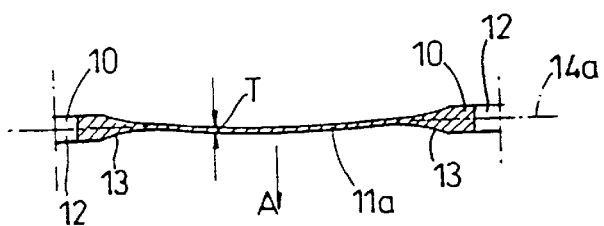
FIG. 3 is a section on the line III—III of FIG. 2.

Referring to FIGS. 2 and 3, the coupling is annular with a generally hexagonal external profile having its apices rounded off. It comprises six circumferentially spaced fixing portions 10 which are at the apices of the hexagonal external shape, the fixing portions being joined by six leaves 11.

Figure 1:
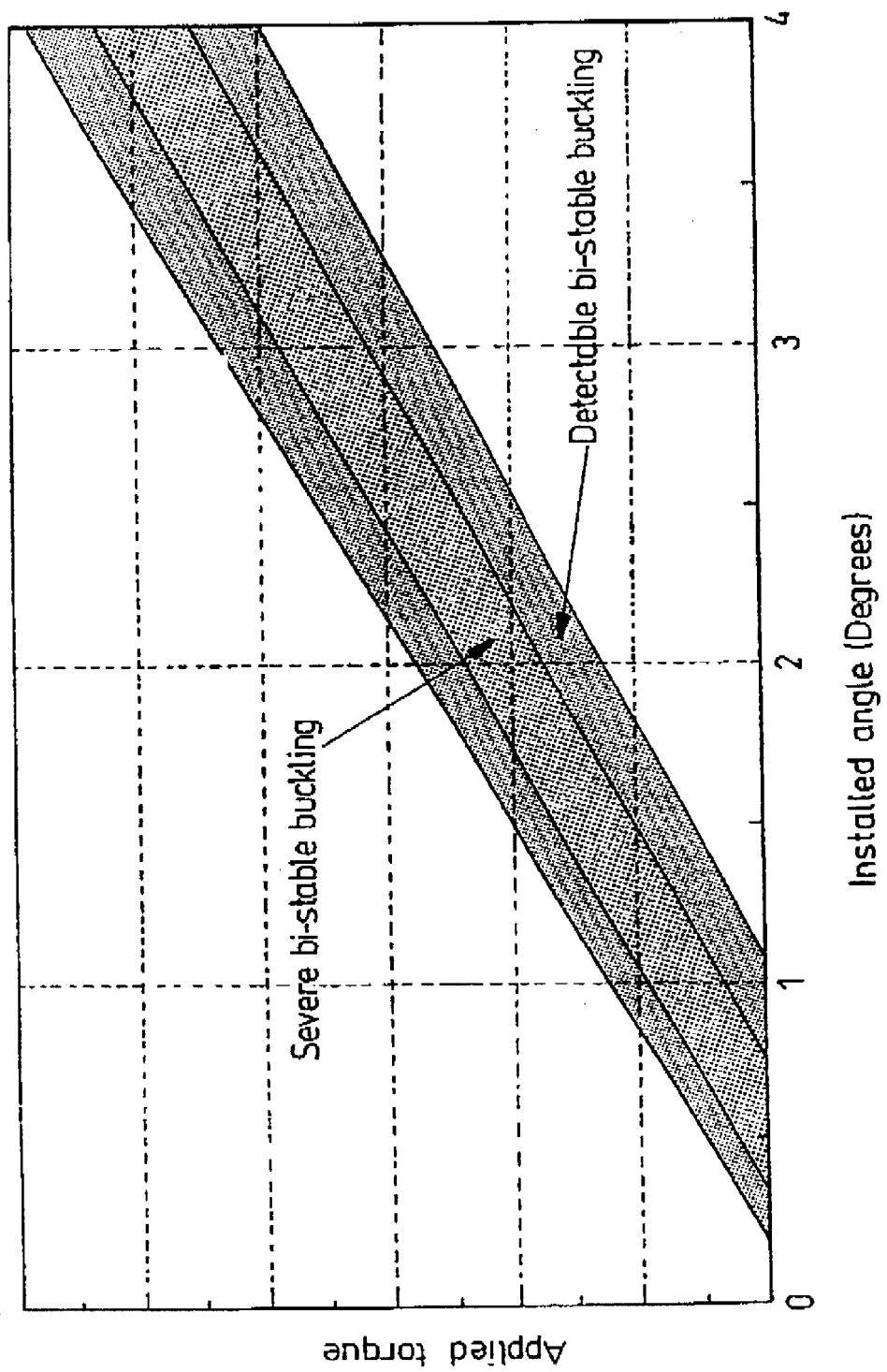
FIG. 1 is a strain behavior graph for flexible couplings showing installed angle versus applied torque.
Figure 12:
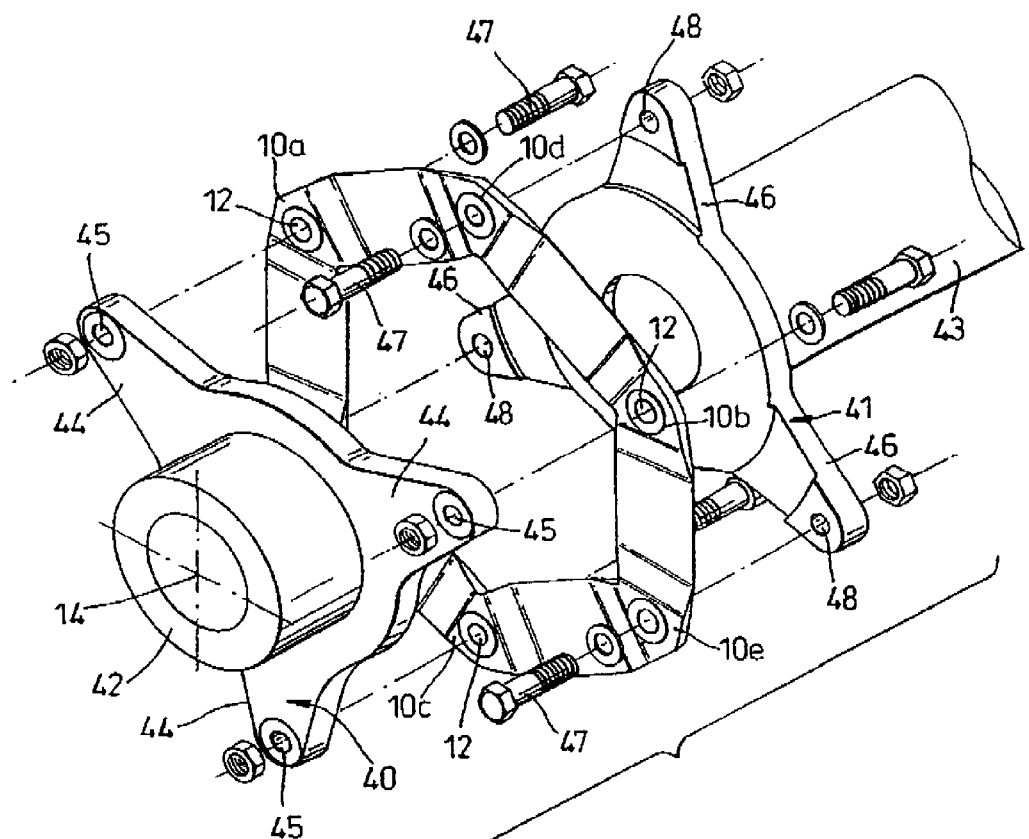
FIG. 12 is a perspective view of an assembly of two rotary members and a coupling.

The fixing portions have holes 12 for bolted connection to respective rotary members which the coupling is to connect. Such rotary members are usually in the form of three-legged spiders as shown in FIG. 12. One such spider is indicated at 40 and the second at 41. The spider 40 carries a boss 42 to receive a shaft whereas a shaft 43 is connected to the spider 41. The legs 44 of the spider 40 are connected to the fixing portions 10a, 10b and 10c of the coupling by nut and bolt assemblies 43 passing through the holes 12 in the fixing portions and corresponding holes 45 in the legs. It will be seen that the legs 44 are connected to alternate fixing portions 10. The legs 46 of the other spider 41 are connected to the alternate fixing portions 10d, 10e, and the other fixing portion not shown in FIG. 12, by nut and bolt assemblies 47 which also pass through corresponding holes 48 in the legs 46. In use the coupling rotates about an axis 14 which is perpendicular to the plane of FIG. 1. When the respective rotational axes of the two rotary members 40, 41 are aligned with one another (i.e. at an installed angle of 0°) then axis 14 of the coupling is also coincident with the axes of rotation of the rotary members as shown in FIG. 12.

As shown in FIGS. 2 and 3 the coupling is a unitary member made of composite material comprising a number of lamninae suitably arranged with appropriate fibre orientations and dispositions to suit the conditions the coupling is required to endure in use. As seen in FIG. 2, the central parts 11a of the leaves 11 are relatively thin in the direction axially of the coupling so that they are able to bend to accommodate angular misalignment between the axes of the rotary members such as 40 and 41.

The fixing portions 10 are substantially thicker than the central parts 11a of the leaves 11. At each end of each leaf 11 there is a tapering transitional portion 13 extending between the central part and the thicker fixing portion 10. Such increase in thickness may be obtained by the provision of additional laminae and/or filler elements in the vicinity of the fixing portions as described in our GB Patent Application No. 9803479.6.

As seen in FIG. 3, viewed in a direction perpendicular to the rotational axis 14, the central part 11a of a leaf 11 is, when unstressed, curved and offset axially from a plane 14a perpendicular to the rotary axis 14 of the coupling and passing through the axial mid-points of the holes 12 in the fixing portions 10. It will be seen that the offset is to one side only of the plane 14a. The curving of the central parts 11a has the effect that if the leaves are loaded in compression between the fixing portions they will always buckle in a pre-determined direction i.e. in the direction of the arrow A.

The radius of curvature of the curved central part 11a in FIG. 3 can be between 10 and 500 times the axial thickness T of the central part 11a as shown in FIG. 3. The radial width W in FIG. 2 of the central part of the leaf may be at least 10 times the thickness T.

Figure 11:
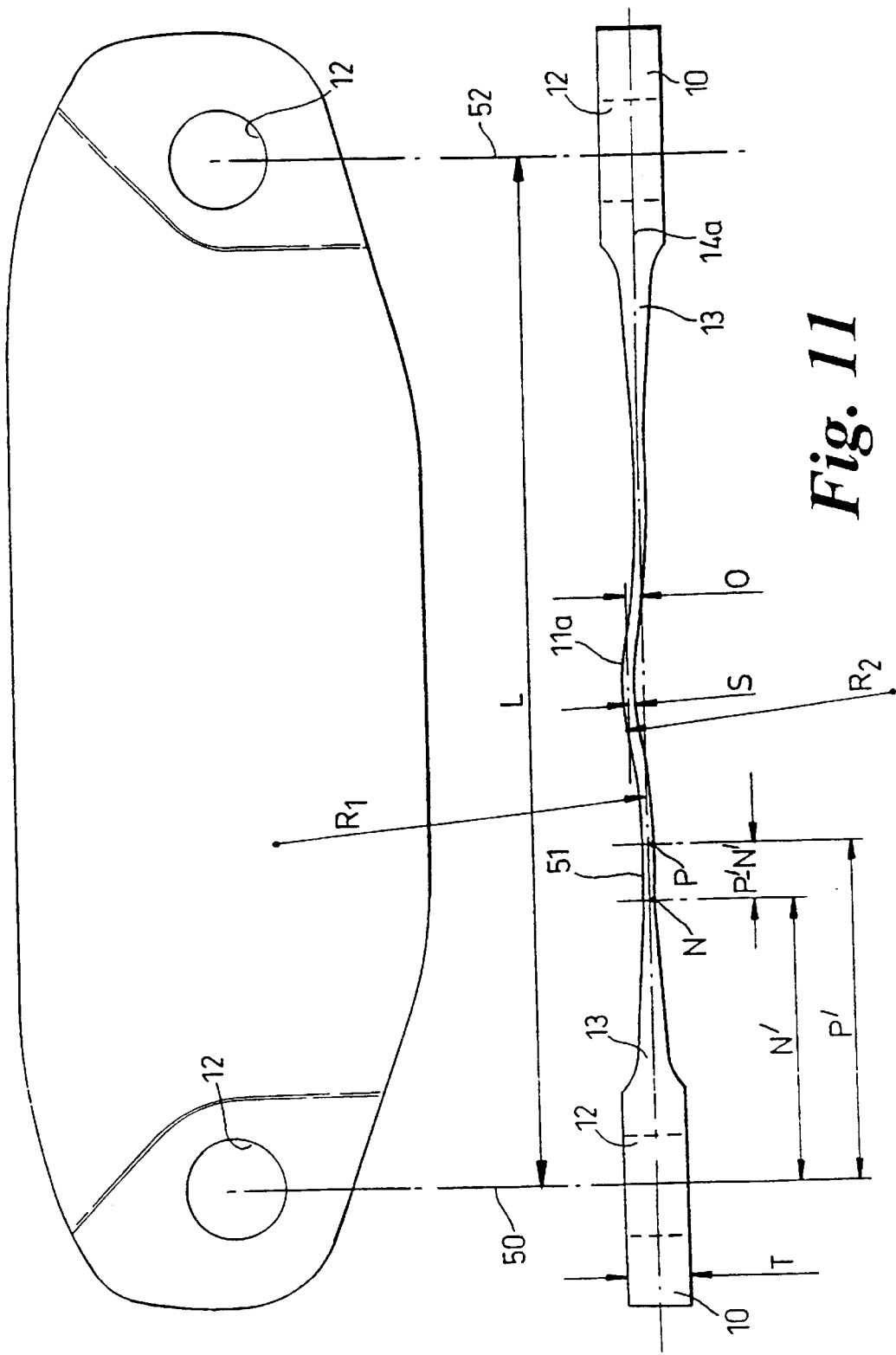
FIG. 11 shows in detail the preferred dimensions of a leaf of the coupling.

FIG. 11 shows a form of leaf in more detail and of a preferred construction. The same reference numerals are used for the same parts thus there are fixing portions 10 at the ends of the leaf and transition portions 13. Each transition portion ends at a point N which is a distance N' from the line 50 which passes through the centre of the hole 12 in the adjacent fixing portion in a direction parallel to the axis 14. There is an intermediate portion 51 between the points N and P which is of constant thickness equal to the thickness of the central portion of the leaf. The length of the intermediate portion is shown as P'-N' and is preferably equal to L/20 where "L" is the distance between the lines 50 and 52 passing through the centres of the holes 12 in adjacent fixing elements 10. However P'-N' could be in a range between L/50 and L/10.

The thickness (S) of the curved central portion is preferably L/20 but could be in the range of L/25 to L/250. The thickness T of the fixing portion is preferably 6S but could be in the range of 2S to 10S. The length N is preferably 0.3L but could be in the range of 0.1L to 0.4L.

The radius of curvature $R_2$ of the curved portion 11a measured to the neutral axis thereof may be 0.7L or in the range of L/4 to 2L. There is a blend radius $R_1$ between the intermediate portion 51 and the curved portion and this (measured to said neutral axis) may be equal to $R_2$ or at least within the same range of values, i.e. between L/4 and 2L.

The offset of the curved portion 11a measured between the neutral axis of the curved portion and the plane 14a indicated at O is preferably L/100 but could be in the range L25 to L250.

Other arrangements may be used for ensuring that, when a leaf buckles, the central part is displaced in a predetermined direction. Thus the transition portions between the central part and the fixing portions of each leaf may be so shaped as to effect this displacement.

Figure 4:
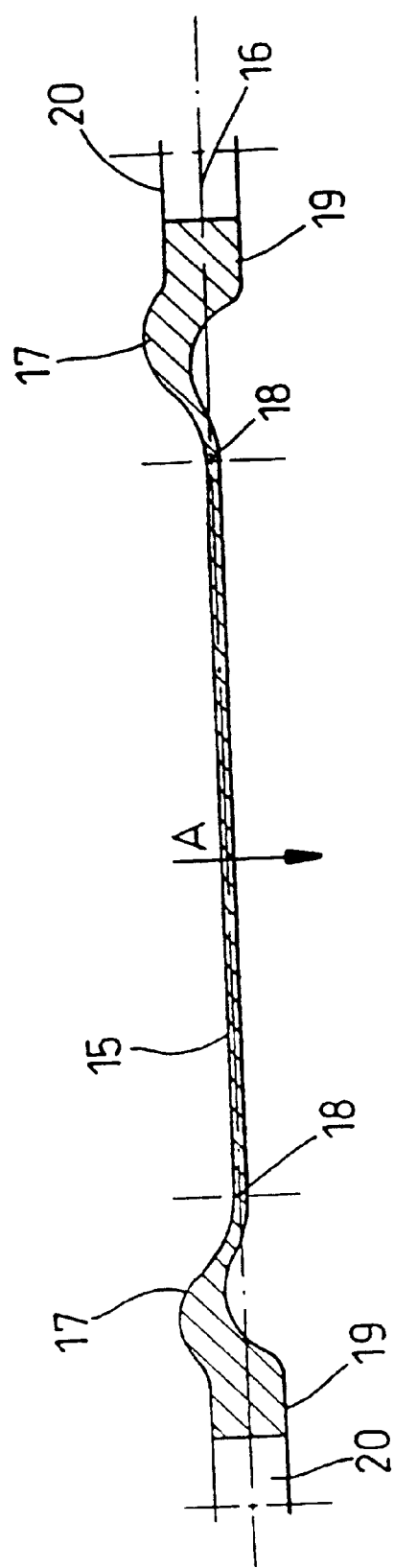
Figure 7:
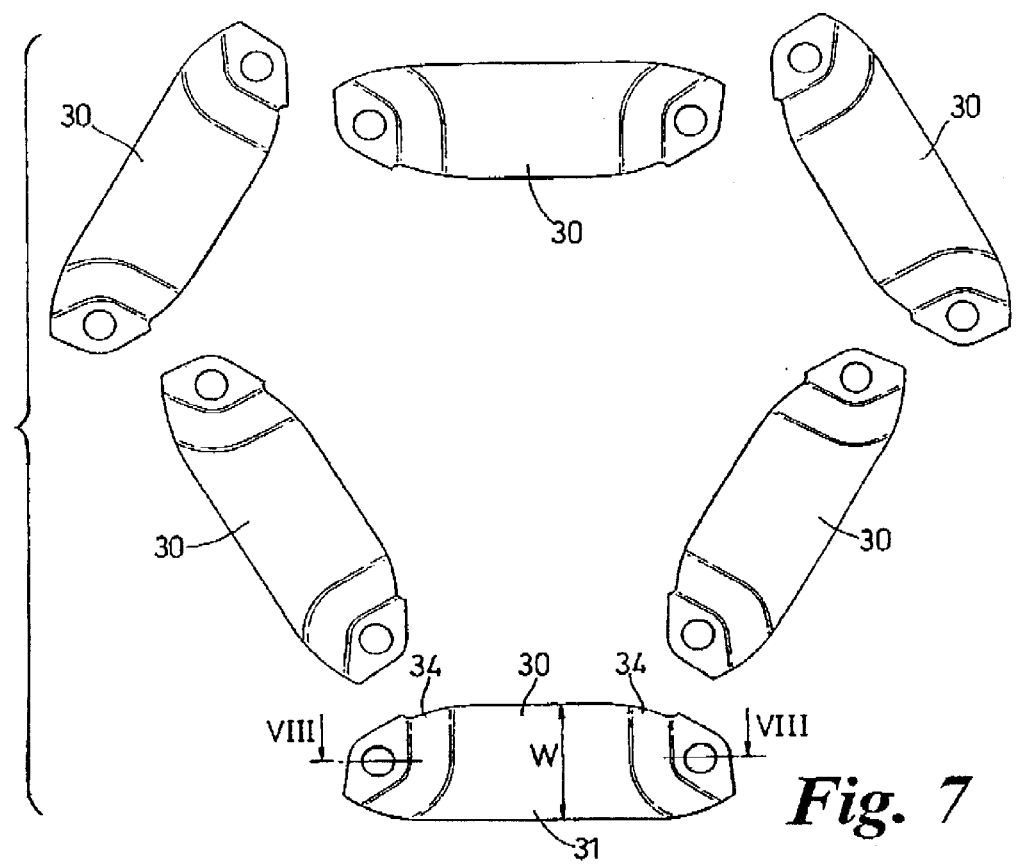
FIG. 7 is an exploded view of a coupling formed of separate links.
Figure 8:
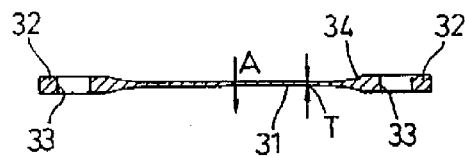
FIG. 8 is a section on the line VIII—VIII of FIG. 7.

This is shown in FIG. 4. The central part of the leaf is shown at 15 and, in an unstressed state, is parallel to a plane 16 perpendicular to the rotary axis 14. There are transitional portions 17 of increasing thickness between the ends 18 of the central part and the fixing portions 19 which have apertures 20. The transition portions are offset to one side only of the plane 16 and this has the effect of causing the central part 15 always to buckle in the direction of the arrow A when there is sufficient compressive force along the leaf between the fixing portions 19.

In another arrangement, the central part of each leaf may be made of at least two layers, one of which is stiffer than the other (with respect to lengthwise compression) so that when the leaf buckles the central part is always displaced towards the stiffer layer.

In this arrangement the reinforcing fibres in the composite material may be, for example, parallel to the length of the central portion in the stiffer layer and at an angle of ±30° to the length in the less stiff layer. These angles are only examples. As mentioned above in another arrangement the fibres in the different layers may have different moduli and/or may be laid up at different angles.

This arrangement is shown in FIGS. 5 and 6. The central part of a leaf is indicated at 21 and has ends 22. Transitional portions 23 of increasing thickness extend between the ends 22 and the fixing portions 24. The central part 21 is, in its unstressed state, parallel to a plane 25 perpendicular to the rotary axis 14 through the axial mid-points of the fixing portions. FIG. 6 shows the central part as being made of two layers 26 and 27 of composite material. The layer 27 is stiffer than the layer 26 so that the layer 27 has a higher resistance to lengthwise compression than the layer 26. Due to the difference in stiffness of the layers 26 and 27 the central part 21 of the leaf will always buckle in the direction of the arrow A in FIG. 5 when sufficient compressive force is applied to the leaf between the fixing portions 24.

As described above the coupling is a unitary member of composite material. However it may be made of a number of discrete links each link comprising two fixing portions, one at each end, and a leaf between the fixing portions. Such an arrangement is shown in FIGS. 7 to 10.

Figure 9:
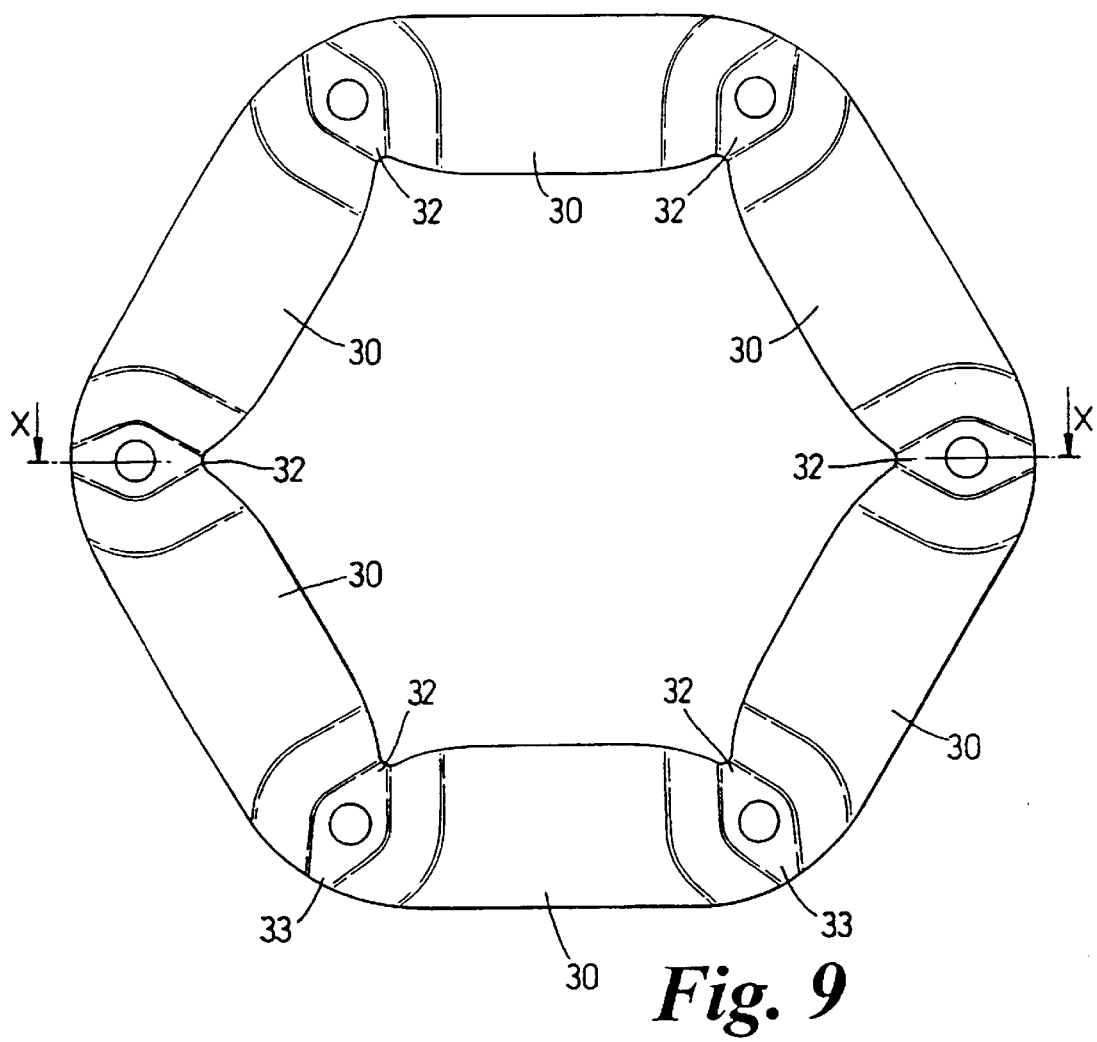
FIG. 9 is a view of the coupling of FIG. 7 assembled.
Figure 10:
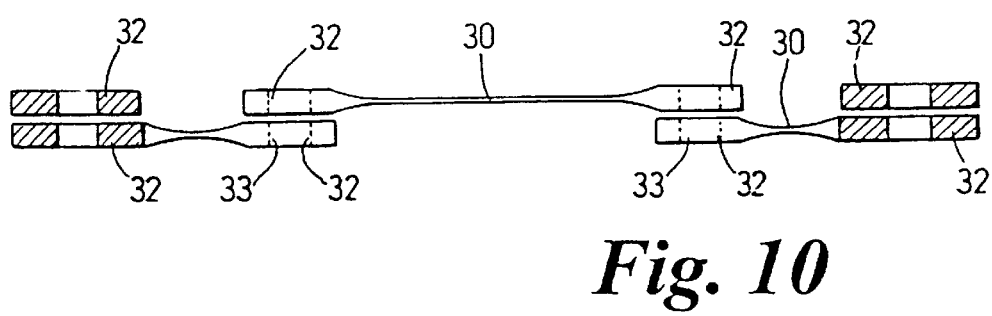
FIG. 10 is a section on the line X—X of FIG. 9.

Referring to these figures the coupling is made of six discrete links 30. Each link comprises a central part 31 which is relatively thin and two thicker fixing portions 32 which are apertured at 33. As will be seen from FIGS. 7 and 8 the thickness T of the central part of each leaf is considerably less than the width W of the central part. As described in relation to FIG. 3 there are transitional portions 34 of increasing thickness between the ends of the central part and the fixing portions. The links 30 are identical and are assembled into a hexagonal annular coupling as shown in FIG. 9. As shown in FIG. 10 the fixing portions 32 of adjacent links overlap, the apertures 33 in the overlapping fixing portions are in alignment and the links are connected together by bolts passing through the aligned apertures 33 which also serve to connect the links to the rotary members such as 40 and 41.

The links will be constructed so that the central parts of the leaves between the fixing portions will buckle in a pre-determined direction when a compressive force is applied between the fixing portions 32 of the links. As shown in FIGS. 7 to 10, the construction consists of two layers of different stiffnesses as described in relation to FIGS. 5 and 6. However each link could be constructed so that the central part of the leaf portion is curved as shown in FIGS. 2, 3 and 11 or so that the transition portion between the central part and the fixing portion is offset as shown and described in relation to FIG. 4.

There is described above a number of different ways in which the leaves of the coupling can be made to buckle in a pre-determined direction when subjected to a compressive force between the fixing portions at the ends of the leaf What the described embodiments have in common is that the central portions of the leaves and/or the transitional portions are asymmetrical with respect to a plane perpendicular to the rotary axis of the coupling and passing through the axial mid-points of the holes in the fixing portions at the ends of the leaf.

The asymmetry may be asymmetry of shape as shown in FIGS. 2 and 3 with the central part 11a of each leaf being curved and offset relative to the plane 14a or as shown in FIG. 4 where the transitional portions 17 are offset from the plane 16. Alternatively or in addition the asymmetry may be of construction as in FIGS. 5 and 6 where the layers 26 and 27 are of different stiffnesses.

It is to be understood that if desired only those leaves which are going to be in compression in use may be designed so that the central part displaces in a pre-determined direction when compressed and that it is not necessary that the central parts of every leaf are displaced in the same direction relative to the coupling.

Industrial Applicability

Since in all the above described constructions the central parts of the leaves will deflect only in a pre-determined direction when sufficient compressive force is exerted between the fixing portions at the ends of the leaf there will be no bi-stable buckling as described in relation to the prior art couplings. Once sufficient compressive force is applied to the leaf between the fixing portions it will deflect in only the pre-determined direction and it will remain deflected in that direction during rotation irrespective of the angular misalignment of the rotary axis of the rotary members being coupled by the coupling. This therefore overcomes the problems of noise and damage caused by the bi-stable buckling of the present couplings.

What is claimed is:

1. A flexible annular coupling made of fiber-reinforced plastic material, said annular coupling having a rotary axis and comprising an even number of fixing portions (10, 19, 24, 32) spaced apart circumferentially around said coupling for connection to two rotary members (40, 41) to be coupled by said coupling and a flexible leaf (11, 31) extending lengthwise between each two adjacent fixing portions, each leaf comprising a central part (11a, 15, 21) having first and second ends and being thinner than said fixing portions and transition portions (13, 17, 23) of gradually increasing thickness between said ends of said central part and said fixing portions, wherein said central part of at least each circumferentially alternate leaf is asymmetrical in shape or construction with respect to a plane (14a, 16, 25) perpendicular to said rotary axis of said coupling and passing through an axial mid-point of adjacent ones of said fixing portions whereby said central part of each said alternate leaf will always be displaced axially in a predetermined direction transverse to its length when such leaf is caused to buckle by a compressive force acting between said fixing portions at said ends of said leaf.

2. A coupling according to claim 1 wherein said central part (11a, 15, 21) of each leaf is asymmetrical in shape or construction with respect to said plane (14a, 16, 25) and will always be displaced axially in the same pre-determined direction transverse to its length when such leaf is caused to buckle by a compressive force acting between said fixing portions (10, 19, 24, 32) at the ends of said leaf.

3. A coupling according to claim 1 wherein said central part (11la) of each of those leaves which is asymmetrical is, when in an unstressed state, curved between its ends so that it is offset to one side, and only one side, of each plane (14a).

4. A coupling according to claim 3 wherein said curved central part of each of said leaves which are curved has a radius of curvature ($R_2$) between ten and five hundred times a thickness (S) of said central part of said leaf measured axially of said coupling.

5. A coupling according to claim 3 wherein said central part of each curved leaf has a central, offset curved portion between intermediate portions (51) of uniform thickness which are parallel to said plane (14a) and extend from said central portion to said adjacent ends of said transition portion (13).

6. A coupling according to claim 5 wherein adjacent axes of said fixing portions include fixing holes and wherein each of said intermediate portion has a length (P'–N') between L/50 and L/10 where L is the distance parallel to said plane between the centers of said fixing holes (12).

7. A coupling according to claim 3 wherein said central portion has a thickness (S) and said intermediate portions have a thickness between L/250 and L/25 where L is the distance parallel to said plane between said centers of fixing holes (12) in adjacent fixing portions.

8. A coupling according to claim 7 wherein each fixing portion has a thickness (T) of between 2S and 10S where S is a thickness of said central portion.

9. A coupling according to claim 3 wherein each transition portion (13) extends a distance of between 0.1L and 0.4L from the center of one of said fixing holes (12) in its adjacent fixing portion (10) where L is the distance parallel to said plane (14a) between the centers of said fixing holes (12) in adjacent fixing portions (10).

10. A coupling according to claim 3 wherein said central part has a neutral axis, and wherein the maximum offset (O) of said neutral axis of said central part (11a) of said leaf from said plane (14a) is between L/250 and L/25 where L is the distance parallel to said plane between the centers of said fixing holes (12) in adjacent fixing portions.

11. A coupling according to claim 1 wherein said transition portions (17) are asymmetrically shaped with respect to said plane (16) so as to effect the displacement in said pre-determined direction of said central parts (15) of those leaves in which this occurs when said leaves buckle under a compressive force acting between said fixing portions at their ends.

12. A coupling according to claim 1 where said transition portions (17) are offset to one side, and only one side, of said plane (16).

13. A coupling according to claim 1 wherein said central part (21) of each of said leaves whose central part is displaced in said pre-determined direction is asymmetrical in construction with respect to said plane (25) and has two layers (26, 27) extending generally perpendicular to said rotary axis of said coupling, a first one of said layers (27) having a higher stiffness to resist lengthwise compression of the leaf than a second one of said layers (26).

14. A coupling according to claim 13 wherein said first and second layers include fibers in orientations or of different moduli.

15. A coupling according to claim 1 in which said c central part of each of said leaves has a width (W) measured radially of said coupling which is at least ten times its thickness (T) measured axially of the coupling.

16. A coupling according to claim 1 and which comprises a number of discrete links (30), each of said links including a fixing portion (32) at each end and a leaf (31) extending between said fixing portions.

17. An assembly comprising two rotary members (40, 41) and a flexible annular coupling according to claim 1, each of said rotary members being connected to different alternate fixing portions (10) of said coupling.

18. A link for forming part of a flexible annular coupling, said coupling comprising a number of discrete links of fiber-reinforced plastic material, said link having first and second ends and comprising a fixing portion (10, 19, 24, 32) at each end of said link and a flexible leaf (11, 31) comprising a central part having first and second ends which is (11a, 15, 21) thinner than said fixing portions and transition portions (13, 17, 23) of gradually increasing thickness between said ends of said central part and said fixing portions, wherein said central part of said leaf (11, 31) is asymmetrical in shape or construction with respect to a plane (14a, 16, 25) passing through an axial mid-point of each of said fixing portions whereby said central part of an alternate leaf will always be displaced in a pre-determined direction transverse to its length when said leaf is caused to buckle by a compressive force acting between said fixing portions.

19. An assembly comprising two rotary members (40, 41) and a unitary flexible annular coupling having a rotary axis, said coupling being made of fiber-reinforced plastic material having an even number of fixing portions (10a, 10b, 10c, 10d, 10e) spaced apart circumferentially of said coupling, each of said rotary members being connected to different alternate fixing portions (10a, 10b, 10c, or 10d, 10e) of said coupling, said coupling including a flexible leaf (11, 31) extending lengthwise between each two adjacent fixing portions, each leaf comprising a central part having opposing ends, said central part being (11a, 15; 21) thinner than said fixing portions and transition portions (13, 17, 23) of gradually increasing thickness between said opposing ends of said central part and said fixing portions, wherein said coupling is so constructed that said central part of at least each circumferentially alternate leaf is asymmetrical in shape or construction with respect to a plane perpendicular to said rotary axis (14) of said coupling and passing through axial mid-points of said fixing portions at said opposing ends of said leaf whereby said central part of each said alternate leaf will always be displaced axially in a pre-determined direction transverse to its length when such leaf is caused to buckle by a compressive force acting between the fixing portions at the ends of the leaf.

* * * * *